| United States Patent [19] | [11] | 4,435,537 |
|---|---|---|
| Horn et al. | [45] | Mar. 6, 1984 |

[54] STORAGE STABLE DISPERSIONS OF AROMATIC POLYESTERS IN POLYHYDROXYL COMPOUNDS AND THEIR PREPARATION

[75] Inventors: Peter Horn, Heidelberg; Anton Hesse; Walter Heckmann, both of Weinheim; Ulrich Lebert, Hettenleidelheim; Alfred Guthmann, Worms; Matthias Marx, Bad Durkheim, all of Fed. Rep. of Germany

[73] Assignee: BASF Aktiengesellschaft, Ludwigshafen, Fed. Rep. of Germany

[21] Appl. No.: 360,763

[22] Filed: Mar. 22, 1982

[30] Foreign Application Priority Data

Mar. 27, 1981 [DE] Fed. Rep. of Germany ....... 3112123

[51] Int. Cl.³ .............................................. C08G 18/14
[52] U.S. Cl. .................................... 524/391; 523/333;
523/334; 523/335; 524/379; 524/386; 524/387;
524/601; 524/604; 524/605; 524/923

[58] Field of Search ....... 523/333, 334, 335; 524/386, 387, 391, 601, 604, 605, 379, 923

[56] References Cited

U.S. PATENT DOCUMENTS

| 3,402,141 | 9/1968 | Matthies et al. | 523/333 |
| 3,481,891 | 12/1969 | Boylan et al. | 524/391 |
| 4,204,987 | 5/1980 | Streets et al. | 524/386 |
| 4,314,928 | 2/1982 | Bier et al. | 524/605 |

FOREIGN PATENT DOCUMENTS

| 2638758 | 2/1978 | Fed. Rep. of Germany | 524/386 |
| 981684 | 1/1965 | United Kingdom | 524/391 |

*Primary Examiner*—Ronald W. Griffin
*Attorney, Agent, or Firm*—Norbert M. Lisicki; David L. Hedden

[57] ABSTRACT

The subject invention relates to storage stable dispersions comprising certain aromatic polyesters dispersed in certain polyhydroxyl compounds and their process of preparation. The dispersions are useful for the preparation of polymers containing urethane and/or isocyanurate linkages.

11 Claims, No Drawings

STORAGE STABLE DISPERSIONS OF AROMATIC POLYESTERS IN POLYHYDROXYL COMPOUNDS AND THEIR PREPARATION

BACKGROUND OF THE INVENTION

1. Field of the Invention

The subject invention relates to storage stable dispersions comprising certain aromatic polyesters dispersed in certain polyhydroxyl compounds and their process of preparation. The dispersions are useful for the preparation of polymers containing urethane and/or isocyanurate linkages.

2. Description of the Prior Art

Dispersions of fillers in polyhydroxyl compounds which are preferably used for the preparation of reinforced polyurethane foams are disclosed in numerous patents and patent applications.

According to the disclosure in European published application No. 11,752, (U.S. Pat. No. 4,243,755) stable filler-polyol dispersions are prepared by simultaneously reducing the particle size of organic and inorganic fillers to no less than 7 microns and dispersing the filler in polyols by means of high local energy density.

Dispersions of copolymers, preferably styreneacrylonitrile copolymers in hydroxyl group containing polyethers, are also known. See, for instance, German Pat. No. 1,222,669, (U.S. Pat. Nos. 3,304,273, 3,383,351 and 3,523,093), German Pat. No. 1,152,536 (British Pat. No. 1,040,452), and German Pat. No. 1,152,537 (British Pat. No. 987,618). Moreover, if the vinyl monomers are directly copolymerized in the polyether polyols, the resultant particles are generally so small that there is no tendency toward sedimentation. A problem with these dispersions, however, is that they must be free of monomers in order to result in polyurethane foams which are odor-free and toxicologically unobjectionable. Otherwise, they cannot be used in the typical areas of application, for instance, in automobile seats and upholstered furniture. This requires, however, that the monomers must be separated from the dispersions, for instance, with the aid of thin-film evaporators.

Also known are dispersions of polyisocyanatepolyaddition products, particularly polyhydrazodicarbonamides and polyhydroxyl compounds [German Application No. 1,260,142 (U.S. Pat. No. 3,325,421), German Published Application No. 2,513,816 (U.S. Pat. No. 4,042,537)] and dispersins of high melting polyesters and polyhydroxyl compounds [European Published Application No. 17,111]. Dispersions of the above-referenced type which contain fillers are usually obtained by the in situ preparation of a dispersed phase in a polyhydroxyl compound. A problem with these relatively stable dispersions is that their preparation is very difficult to reproduce. If the dispersions begin to precipitate during preparation or storage, (for instance because of slight processing variations, temperature variations, or as a result of an external generally unknown trigger event), the fillers can generally no longer be dispersed.

According to European Published Application No. 17,111, dispersions are produced by melting by means of a high shear gradient. It is characteristic of this process that the disperse phase is not bonded into the polymer structure during the polyurethane manufacture, but that it is present in the molded part as a reinforcing filler. It is also characteristic of the process that the temperature during the polyurethane reaction is chosen in such a manner that the melting point of the crystals is not reached.

Storage stable crystalline suspensions used for the manufacture of urethane and/or isocyanurate group-containing foams are described in German Patent Application No. P 3,001,462.1. The crystalline suspensions contain polyols generally used in preparing flexible foams as the continuous phase and rigid crystalline organic compounds having at least one Zerewitinoff active hydrogen atom, which have melting points of 30° C. to 260° C. and molecular weights of 178 to approximately 100,000, as the disperse phase. These dispersions are advantageous because the rigid crystalline organic compound can be incorporated in the polyurethane structure in a controllable manner by its melting point and/or the transition from the disperse into the continuous phase. Thereby the already formed cell membranes can be further stabilized. The problem with these dispersions, however, is that the crystalline suspensions are difficult to reproduce.

In view of the problems described in the prior art, there is a need for storage stable dispersions which are flowable at room temperature and which can be produced in an easily reproducible manner. Furthermore, the dispersions must be capable of reacting to form polymers containing urethane and/or isocyanurate linkages by using common processing machinery.

SUMMARY OF THE INVENTION

The subject invention relates to storage stable dispersions comprising
(a) a disperse phase comprising 5 to 35 percent by weight relative to the overall dispersion of a polyester of (i) an acid selected from the group consisting of isophthalic acid, terephthalic acid, a mixture of terephthalic acid and an aliphatic dicarboxylic acid, a mixture of terephthalic acid and an aromatic dicarboxylic acid, and a mixture of terephthalic acid or aliphatic dicarboxylic acid, and aromatic dicarboxylic acid, and (ii) an alcohol having 1 to 6 carbon atoms wherein said polyester has a melting viscosity at 150° C. of 15 mPas to 3000 mPas; and
(b) a continuous phase consisting of from 65 to 95 percent by weight relative to the overall dispersion of a polyhydroxyl compound having a functionality of 2 to 8, a hydroxyl number of 20 to 800, and a melting point below 30° C.
such that the disperse phase is soluble at temperatures above 35° C. and such that more than 50 percent of the dispersed phase has particle sizes of 10.5 to 100 microns.

In preparing the dispersion, preferably from 0.01 to 3.0 parts by weight per 100 parts by weight of dispersion of an organic and/or inorganic crystallization accelerator is incorporated in the dispersion at a temperature of 35° C. to 160° C. with the proviso that said temperature is above the cloud point of components (a) and (b) and below the melting temperature of the crystallization accelerator; and thereafter the mixture is allowed to cool.

The subject dispersions are useful for preparing cellular and non-cellular polymers containing urethane and/or isocyanurate linkages.

DESCRIPTION OF THE PREFERRED EMBODIMENT

Suitable as the disperse phase of the dispersions according to this invention are crystallizable polyesters of isophthalic acid, terephthalic acid, or a mixture of terephthalic acid and aromatic and/or aliphatic dicarboxylic acids, and alcohols with 1 to 6 carbon atoms, preferably diols with 2 to 6 carbon atoms and primary hydroxyl groups having at least one radical with one Zerewitinoff active hydrogen atom. The polyesters (a) are soluble in the continuous phase, i.e., the polyhdroxyl compounds (b) at temperatures from 35° C. to 160° C., preferably 35° C. to 110° C., and are incorporated in the polyurethane structure upon reaction with the polyisocyanates.

The crystallizable polyesters (a) are mono- to tetrafunctional, preferably difunctional. They have carboxyl- and/or preferably hydroxyl-groups. Their hydroxyl numbers are from 10 to 400, preferably 60 to 250, and they have melting viscosities at 150° C. of 15 mPas to 3000 mPas, preferably of 30 mPas to 700 mPas. If the dispersions are to be used for the preparation of polyurethane flexible foams, the disperse phase preferably contains polyesters with melting viscosities at 150° C. of 30 mPas to 200 mPas, and if the dispersions are used for the preparation of polyurethane or polyisocyanurate rigid foams, the disperse phase contains polyesters with melting viscositites at 150° C. of 400 mPas to 700 mPas.

The polyesters may be prepared by conventional methods such as by condensation in inert solvents, optionally in the presence of water chasers. Preferably, however, they are produced from the starting components by melting condensation at temperatures of 140° C. to 220° C., preferably from 120° C. to 200° C. The polyesters solidify upon cooling of the melt, preferably in an amorphous, glass-like manner, sometimes partially crystalline and opaque, and have softening points according to KSN (Kramer-Sarnow-Nagel) of 30° C. to 95° C., preferably 55° C. to 80° C., and can always be crystallized by heating in organic solvents, for instance ethanol or the polyhydroxyl compounds. The molecular weights are between approximately 180 and 2500, preferably between 200 and 1500, and particularly 240 and 1000.

Isophthalic acid is preferably used to prepare the polyesters which are to be used as the disperse phase. However, also very well suited are mixtures of terephthalic acid and aromatic dicarboxylic acids such as isophthalic acid and orthophthalic acid, and/or possibly ethylenically unsaturated aliphatic dicarboxylic acids having 2 to 6 carbon atoms, such as succinic acid, adipic acid and fumaric acid with the mixtures advantageously having a terephthalic acid content of 20 to 95, preferably 40 to 80 mole percent relative to the dicarboxylic acid mixture. Mixtures of terephthalic acid and isophthalic acid having at least 20 mole percent, preferably 40 to 80 mole percent of terephthalic acid, mixtures of terephthalic acid and orthophthalic acid having at least 60 mole percent, preferably 70 to 90 mole percent of terephthalic acid, and mixtures of terephthalic acid and aliphatic, possibly ethylenically unsaturated dicarboxylic acids with 2 to 6 carbon atoms with at least 50 mole percent, preferably 60 to 95 mole percent of terephthalic acid have proven to work very well. Terephthalic acid alone can also be used but only in combination with certain alcohol mixtures.

Instead of the above-referenced dicarboxylic acids, dicarboxylic acid derivatives, for instance, the mono and/or diesters with mono- and/or bifunctional alcohols having 1 to 4 carbon atoms or their anhydrides may also be used.

Preferably used as alcohols to prepare the polyesters are those having 1 to 6 carbon atoms, preferably diols with 2 to 6 carbon atoms and primary hydroxyl groups. Representative examples include ethylene glycol, 1,3-propane diol, trimethylene glycol, 1,4-butane diol, 1,5-pentanediol, 1,6-hexanediol, dibromoneopentylglycol and particularly neopentylglycol. The diols may be used individually or as mixtures with mixtures of neopentylglycol and ethylene glycol being preferred.

In addition to the above-referenced symetrically structured diols, the following may also be used: monoalcohols such as benzyl alcohol, hexanol-1 or 2-ethylhexanol-1 may be used in quantities up to 20 mole percent, preferably 5 to 15 mole percent; assymetrically structured diols such as propylene glycol, 1,3-butane diol, and dipropylene glycol in quantities of up to 60 mole percent, preferably 5 to 50 mole percent; and multifunctional alcohols such as glycerine and trimethylol propane in quantities of up to 30 mole percent, preferably 2 to 20 mole percent. The mole percentages are relative to the total amount of alcohol used. Polyesters of isophthalic acid are preferably condensed with symetrically structured diols. Part of the symetrically structured diols must be replaced by assymetrical diols if terephthalic acid is used exclusively; for example, mixtures of symetrically structured diols such as ethylene glycol, neopentylglycol, 1,4-butanediol, 1,6-hexanediol and assymetrically structured diols such as propylene glycol, dipropylene glycol, 1,3-butane diol in mole ratios of 1:99 to 99:1 have proven to work very well.

Suitable as the polyhydroxyl compounds (b) for the continuous phase are those which are liquids at 10° C. to 30° C., particularly 25° C., having a functionality of 2 to 8 and a hydroxyl number of 20 to 800. Mixtures of those polyhydroxyl compounds and soluble cyrstalline components may also be used taking into consideration the requirement that the mixture must be homogeneous and liquid in the referenced temperature range.

Examples of polyhydroxyl compounds which can be used as the continuous phase are polyester polyols with functionalities of 2 to 6, preferably 2 to 4, and hydroxyl numbers of 20 to 700, preferably 280 to 490, prepared from organic dicarboxylic acids, preferably aliphatic dicarboxylic acids having 2 to 12, preferably 4 to 8 carbon atoms in the alkylene radical and multi-functional alcohols, preferably diols. Examples of aliphatic dicarboxylic acids which can be used to prepare the polyesters include succinic acid, glutaric acid, pimelic acid, undecandioc acid, dodecanioc acid, and preferably adipic acid and aromatic dicarboxylic acids such as phthalic acid and terephthalic acid. Examples of alcohols which can be used to prepare the polyesters include bi- and multifunctional, particularly bifunctional alcohols such as propylene glycol, 1,3-propane diol, dipropylene glycol, 1,5-pentamethylene glycol, 1,8-octamethylene glycol, 1,10-decamethylene glycol, glycerine, trimethylolpropane, pentaerythritol, as well as sucrose and sorbitol. Preferably used are ethylene glycol, diethylene glycol, 1,4-butane diol, and 1,6-hexamethylene glycol. In addition to this, alkanol amines, dialkanol amines and trialkanol amines such as ethanol amine, diethanol amine, triethanol amine and trisopropanol amine can be used as multifunctional alcohols. The referenced dicarboxylic acids and multifunctional alcohols may also be used in the form of mixtures. Polyester polyols of adipic acid or mixtures of succinic, glutaric, and adipic acid and diethylene glycol and alcohol mixtures of ethylene glycol/1,4-butane diol, ethylene glycol/diethylene glycol, ethylene glycol/trimethylol propane, diethylene glycol/trimethylol propane, ethylene glycol/pentaerythritol, ethylene glycol/triisopropanol amine and diethylene glycol/triisopropanol amines have proven to work particularly well and are therefore used on a preferred basis.

The polyester polyols have molecular weights of approximately 220 to 3000 and preferably of 300 to 800.

Instead of the referenced polyester polyols, which may be used individually or as mixtures, homogeneous mixtures of the above-referenced polyester polyols which are liquid at 10° C. to 30° C. and soluble crystalline organic components such as hydroxyl group-containing polyesters of aromatic dicarboxylic acids, and preferably unsubstituted linear diols, may be used.

Preferably used as the polyhydroxyl compounds (b) for the continuous phase, however, are polyether polyols having functionalities of 2 to 8, preferably 2 to 4, and hydroxyl numbers of 20 to 800, preferably 25 to 700, which are produced in accordance with familiar processes, for instance by anionic polymerization with alkali hydroxides, such as sodium or potassium hydroxide, or alkali alcoholates such as sodium methylate, potassium or sodium ethylate, or potassium isopropolate as catalysts or by cationic polymerization with Lewis acids such as antimony pentachloride, borofluoride-etherate and others as catalysts involving the reaction of one or more epoxides having 2 to 8 carbon atoms and a initiator molecule containing 2 to 8, preferably 2 to 4 active hydrogen atoms.

Suitable epoxides include, for instance, tetrahydrafuran, propylene oxide, 1,3-propane oxide, 1,2- or 2,3-butylene oxide, styrene oxide, epichlorohydrin and preferably ethylene oxide and propylene oxide. The epoxides may be used individually, alternatingly in sequence, or as mixtures. Possible starter molecules include: water, organic dicarboxylic acids such as succinic acid, adipic acid, phthalic acid and terephthalic acid, aliphatic and aromatic, possibly N-mono, N,N- and N,N'-dialkyl substituted diamines with 1 to 4 carbon atoms in the alkyl radical, such as possibly mono- and dialkyl substituted ethylene diamine, diethylene triamine, triethylene tetramine, 1,3-propane diamine, 1,3- or 1,4-butane diamine, 1,2-, 1,3-, 1,4-, 1,5- and 1,6-hexamethylene diamine, phenylene diamines, 2,4- and 2,6-toluene diamine and 4,4'-2,4'- and 2,2'-diaminodiphenyl methane. Particularly interesting as starter compounds of the referenced groups are N,N,N',N'-tetrakis (2-hydroxyethyl)ethylene diamine, N,N,N',N'-tetrakis (2-hydroxypropyl)ethylene diamine, N,N,N',N'',N''-pentakis(2-hydroxypropyl)diethylene triamine, phenyldiisopropanol amine and higher alkylene oxide adducts of aniline.

Other suitable initiator molecules are alkanol amines such as ethanol amine, diethanol amine, N,-methyl and N-ethylethanol amine, N-methyl and N-ethyldiethanol amine and triethanolamine and ammonium hydrazine and hydrazide. Preferably used are multifunctional, particularly bi- and/or trifunctional alcohols such as ethylene glycol, propylene glycol, 1,3-propane diol, diethylene glycol, dipropylene glycol, 1,4-butane diol, 1,6-hexamethylene glycol, glycerine, trimethylol propane, pentaerythritol, sorbitol and saccharose.

The polyether polyols have moleculer weights from 200 to 7000 and preferably from 500 to 6500. They may be used individually or in the form of mixtures.

Mixtures of polyester polyols and polyether polyols, as well as hydroxyl group containing polyester amides and polyacetals and their mixtures may also be used as the continuous phase if they meet the above-referenced requirements.

The disperse phase of the dispersions according to this invention is from 5 to 35 percent by weight, preferably 10 to 30 percent by weight, and particularly 15 to 26 percent by weight relative to entire dispersion, and the continuous phase is from 65 to 95 percent by weight, preferably 70 to 90 percent by weight, and particularly 74 to 85 percent by weight relative to the overall dispersion. The dispersions are liquid and do not show any sedimentation even after prolonged storage periods.

In order to prepare the dispersions, the crystalline polyester (a) (the disperse phase) and the polyhydroxyl compounds (b) (the continuous phase) are mixed and are heated until a clear solution is formed. Temperatures of 35° C. to 160° C., preferably 110° C. to 150° C., are normally sufficient for this purpose. The solution is allowed to cool while being stirred in such a manner to maintain a low shear effect. At a temperature above the cloud point of components (a) and (b) and below the melting temperature of the crystallization acelerator 0.01 to 3 percent by weight, preferably 0.02 to 0.2 percent by weight, relative to the overall solution, of an organic and/or inorganic crystallization accelerator is incorporated in the solution. The referenced temperature range, as a function of the starting materials used, is determined experimentally. Preferably used as crystallization accelerators are previously produced dispersions of the same components (a) and (b). Also suited for this purpose are crystallization accelerators such as talcum, metal stearates, for instance zinc, calcium and/or magnesium stearate, and other nucleation agents. Unless a crystallization accelerator is used, a reproducible manufacture of the dispersions according to this invention can normally not be guaranteed. In such cases lumps and solids are frequently produced which precipitate on the agitator and at the vessel wall.

According to another process variation, the polyester (a) is initially allowed to crystallize out of part of the polyhydroxyl compound (b) and subsequently dilutes the resultant dispersion with the remaining part of the polyhydroxyl compound (b) at 30° C. to 80° C.

It is also of importance in the preparation of the dispersions according to this invention that the melting point of the crystallizing polyesters (a) is above the coring temperature of the solution of components (a) and (b). Otherwise course solid particles may be formed which make processing of the dispersion more difficult or even impossible.

The preparation of the dispersions according to this invention may take place on a batch type basis in agitator vessels on a continuous basis in an agitator vessel cascade.

The crystallized size of the polyesters (a) of the dispersions varies between 1 and 100 microns with more than 50 percent by weight of the polyesters (a) having a particle size of 10.5 to 100 microns, preferably of 12 to 100 microns, and in particular of 12 to 40 microns.

The dispersions according to this invention are used for the preparation of noncellular, and particularly cellular polymers containing urethane and/or isocyanurate groups. An advantage of using the dispersions is that the polyesters (a) as well as the polyhydroxyl compounds (b) are reacted with the polyisocyantes to form polyurethanes. Because of their melting point and/or the transition from the disperse into the continuous phase, the polyesters (a) can be incorporated in the foam structure on a controlled basis. Since the polyesters (a) are incorporated at a point in time at which the polyurethane structure is already partially formed, possibly existing cell membranes can be stabilized in a controlled manner. In addition to this the temperature of the core of the molded part can be influenced in a controlled manner by the consumption of melting heat.

For the preparation of noncellular, or preferably cellular polyurethanes and/or polyisocyanurates, the dispersions according to this invention can be processed directly. However, if necessary, the storage stable dispersions may also be diluted with the above-referenced polyhydroxyl compounds prior to processing, that is they may be adjusted to the optimum content of polyester (a).

Polymers containing urethane, isocyanurate, or both types of linkages are prepared by methods well known in the art by reacting the subject dispersioins with an organic polyisocyanate. Polyisocyanates which can be used are aliphatic, cycloaliphatic, araliphatic and preferably aromatic multifunctional isocyanates. Detailed examples include: alkylene diisocyanates having 4 to 12 carbon atoms in the alkylene radical, such as 1,12-dodecamethylene diisocyanate, 1,4-tetramethylene diisocyanate, and preferably 1,6-hexamethylene diisocyanate; cycloaliphatic diisocyanates, such as 1,3- and 1,4-cyclohexane diisocyanate, as well as any desired mixtures of these isomers, 1-isocyanato-3,3,5-trimethyl-5-isocyanatomethylcyclohexane (isophorone diisocyanate), 2,4- and 2,6-hexahydrotoluene diisocyanate as well as the corresponding isomer mixtures, 4,4'-, 2,2'- and 2,4'-dicyclohexylmethane diisocyanate as well as the corresponding isomer mixtures; and preferably aromatic di- and polyisocyanates such as 4,4'-, 2,4'- and 2,2-diisocyanato-diphenylmethane, and the corresponding isomer mixtures, 2,4- and 2,6-diisocyanato toluene, and the corresponding isomer mixtures, 1,5-diisocyanato-naphthaline, polyphenyl polymethylene polyisocyanates, 2,4,6-triisocyanato toluene and preferably mixtures of diphenyl methane diisocyanates and polyphenyl polymethylene polyisocyanates (crude MDI). The reference di- and polyisocyanates may be used individually or in the form of mixtures.

Modified multifunctional isocyanates, that is products which are obtained by chemical reaction of the above di- and/or polyisocyanates, are also frequently used. Examples for modified organic di- and polyisocyanates include: carbodiimide group containing polyisocyanates according to German Pat. No. 1,092,007; allophanate group containing polyisocyanates as they are described, for instance in British Pat. No. 994,890, the published data of Belgian Pat. No. 761,626 and Dutch Published Application No. 7,102,524; isocyanurate group containing polyisocyanates such as are described in German Pat. No. 1,022,789, 1,222,067 and 1,027,394 as well as German Published Application Nos. 1,929,034 and 2,004,048; urethane group containing polyisocyanates as are described, for instance in the published data of Belgian Pat. No. 752,261 or U.S. Pat. No. 3,394,164; acylated urea group containing polyisocyanates such as described in German Pat. No. 1,230,778; biuret group containing polyisocyanates, for instance as disclosed in German Pat. No. 1,101,394 and British Pat. No. 889,050; polyisocyanates produced by telomerization reactions, for instance as disclosed in Belgian Pat. No. 723,640; and ester group containing polyisocyanates as are described for instance in British Pat. Nos. 965,474 and 1,072,956, U.S. Pat. No. 3,567,765 and German Pat. No. 1,231,688.

Preferably used however are urethane group-containing polyisocyanates, for instance based upon 4,4'-diphenylmethane diisocyanate or toluene diisocyanate, modified for instance with low molecular diols, triols or polyoxypropylene glycols; carbodiimide groups and/or isocyanurate ring containing polyisocyanate, for instance based on diphenylmethane diisocyanate, and/or toluene diisocyanate, and particularly toluene diisocyanate, diphenylmethane, diisocyanate; mixtures of diphenylmethane diisocyanates and polyphenyl polymethylene polyisocyanates (crude MDI); and mixtures of toluene diisocyanates and crude MDI.

Blowing agents which may be used for the preparation of cellular polyurethane elastomers and polyurethane and/or polyisocyanurate foams include water which reacts with isocyanate groups by forming carbon dioxide. Water is advantageously used in quantities of 0.1 to 3 ercent relative to the weight of the polyisocyanate and/or 0.1 to 2 percent relative to the total weight of polyisocyanate and dispersion. If needed, greater water quantities can also be used.

Other useful blowing agents are low boiling liquids which evaporate under the influence of the exothermal polymerization and/or polyaddition reactions. Suitable for this purpose are liquids which are inert with respect to the organic polyisocyanate and have boiling points below 100° C. Examples of preferably used liquids are halogenated hydrocarbons such a methyl chloride, trichlorofluoromethane, dichlorodifluoromethane, dichlorodifluoromethane, dichloromonofluoromethane, dichlorotetrafluoroethane and 1,1,2-dichloro-1,2,2-trifluoroethane. Mixtures of these low boiling liquids with each other and/or with other substituted or unsubstituted hydrocarbons may also be used.

The most advantageous amount of low boiling liquids for the manufacture of the foams depends upon the desired foam density and whether water is used. Generally quantities of 5 to 40 percent by weight, relative to 100 parts by weight of organic polyisocyanate and/or 2 to 30 percent relative to the overall weight of polyisocyanate and dispersion, bring about satisfactory results. For the preparation of integral foams only inert low boiling liquids are used.

Suitable catalysts for accelerating the polyurethane formation between the dispersion, possibly water and the polyisocyanates, include tertiary amines such as dimethylbenzyl amine, N,N,N',N'-tetramethyldiaminoethyl ether, bis(dimethylaminopropyl)urea, N-methylmorpholine, N-ethylmorpholine, dimethylpiperazine, 1,2-dimethylimidazol, and preferably triethylene diamine; metal salts such as tin dioctoate, lead dioctoate, tin diethylhexoate, and preferably tin-(II) salts and dibutyl tin dilaurate as well as particularly mixtures of tertiary amines and organic tin salts. Preferably used are 0.1 to 5.0 percent by weight of tertiary amine catalyst and/or 0.01 to 1.0 percent by weight of metal salts, said weight being relative to the weight of the dispersion.

For the preparation of isocyanurate group containing foams, commonly used cyclization and polymerization catalysts for polyisocyanates have proven to work well. Examples include: strong bases such as quarternary ammonium hydroxides, for instance benzyl trimethyl ammonium hydroxide; alkali metal hydroxides such as sodium or potassium hydroxides; alkali metal alkoxides sich as sodium methylate and potassium isopropylate; trialkyl phosphenes, for instance trialkyl phosphene; alkyl aminoalkyl phenols, for instance 2,4,6-tris(dimethylaminomethyl)phenol; 3- and/or 4-substituted pyridines, for instance 3- or 4-methyl pyridine; metal organic salts such as tetrakis(hydroxyethyl)sodium borate; Friedel-Crafts catalysts, for instance aluminum chloride, iron-(III)-chloride, borofluoride and zinc chloride; and alkali metal salts of weak organic acids and nitrophenolates such as potassium octoate, potassium-2-ethyl hexoate, potassium benzoate, sodium picrate and potassium-phthalimide. Preferably used are the strongly basic, N,N',N"-tris(dialkylamino alkyl)-s-hexahydrotriazines, for instance the N,N',N"-tris(dimethylaminopropyl)-s-hexahydrotriazine, possibly in combination with aliphatic, low molecular mono- and/or di-carboxylic acids, for instance acetic acid and/or adipic acid or aromatic carboxylic acids such as benzoic acid.

The amount of isocyanurate group forming catalyst used depends upon the effectiveness of the catalyst under consideration. It was generally found to be advantageous to use 1 to 15 parts by weight, preferably 3.5 to 10 parts by weight of catalyst, per 100 parts by weight of organic polyisocyanate. In order to prepare isocyanurate group containing polyurethane foams the catalysts promoting the urethane and isocyanurate group formation can also be mixed.

As already stated, auxiliaries and additives may be incorporated in the possibly foamable reaction mixture of polyisocyanate dispersion and catalyst as well as possibly blowing agents. These include for instance, chain extenders, organic and inorganic fillers, surface active foam stabilizers, hydrolysis protection agents, pore regulators, fungistatic and bacteriostatic substances, dyes, pigments and flame retardants.

The polyurethanes and/or polyisocyanurates can be produced without additional use of commonly applied chain extenders or crosslinking agents. In spite of this, it has proven to be advantageous to use chain extenders or crosslinking agents in some cases to facilitate process engineering. Suitable chain extenders or crosslinking agents have molecular weights of 30 to 600, preferably 60 to 300, and preferably have 2 active hydrogen atoms. Suitable substances include for instance aliphatic and/or aromatic diols with 2 to 14, preferably 2 to 6 carbon atoms, such as propylene glycol and trimethylene glycol, 1,5-pentanediol, 1,6-hexanediol and preferably ethane diol, 1,4-butanediol, and bis(2-hydroxyethyl)hydroquinone; diamines such as ethylene diamine, and possibly 3,3'- or 3,3',5,5'-di- or tetrasubstituted 4,4'-diaminodiphenylmethanes; ethanol amines such as triethanol amine; and multifunctional alcohols such as glycerine, trimethylolpropane; and low molecular hydroxy group containing polyalkylene oxides of the above referenced raw materials.

Fillers, for instance organic and inorganic fillers, having particle sizes below 10 microns, preferably of 0.1 micron to 5 microns, in quantities of 5 to 30 percent by weight, preferably of 10 to 20 percent by weight relative to the overall weight of the dispersion, may be incorporated in the dispersions according to this invention.

Examples for organic fillers include: brittle resins which are known as binders in the printing industry, for instance those based on phenol, colophonium or melamine and formaldehyde; polyesters with melting points in excess of 190° C., preferably crosslinked polyesters based on di- or higher functional carboxylic acids; homo- and copolymerizates of cyclopentadiene; ketone resins, for instance based on cyclohexanone; brittle polyurethane materials having melting points higher than 190° C., for instance crosslinked urethane and isocyanurate group containing polyurethane; polyvinylchloride, polyamide-6 and -6,6; acrylate graft rubbers, butadiene graft rubbers; and polyvinyl acetate.

Inorganic fillers such as the basically known, commonly used fillers, reinforcing agents, weighting materials, agents for improving the abrasion resistance in paints, coatings etc. have proven to work particularly well and are, therefore, used on a preferred basis. However, inorganic pigments can also be used. Detailed examples include: silicatic minerals, for instance fibrous silicates such as antigorite, serpentine, hornblends, amphiboles, chrisotil, talcum, metal oxides such as kaolin, aluminum oxide hydrate, titanium oxides, iron oxides; metal salts such as calcium carbonate, heavy spar, barium sulphate; and inorganic pigments such as cadmium sulphide, zinc sulphide, as well as glass.

Other auxiliaries which may be used include for instance surface active substance which support the homogenization of the raw materials and which may also be suited for regulating the cell structure of the foams. These include siloxane-oxyalkylene mixed polymers and other organo polysiloxanes; ethoxylated alkylphenols; ethoxylated fatty alcohols; paraffin oils; castor oil and/or esters of rizinolaeic acid; and Turkish red oil. These substances are used in quantities of 0.1 to 5 parts by weight per 100 parts by weight of the mixture of polyisocyanate and dispersion.

Flame retardants which may be used include tricresyl phosphate, tris-2-chloroethyl phosphate, trischloropropyl phosphate, and tris-2,3-dibromopropyl phosphate; brominated and chlorinated polyethers; and reaction products of brominated and/or chlorinated aromatic dicarboxylic anhydrides with bi- and higher functional alcohols such as ethylene glycol, diethylene glycol and glycerine.

In addition to the already referenced halogen substituted phosphates, inorganic flame retardants such as antimony trioxide, arsenic oxide, ammonium phosphate, ammonium sulphate, alkali metal salts of hypophosphorus acid, aluminum oxide hydrate and elementary phosphorus, as well as isocyanurate acid derivatives such as melamine, dicyanodiamide, and guanidine salts, for instance guanidine carbonate, can be used to render foams flame resistance. It has generally been found to be advantageous to use 5 to 50 parts by weight, perferably 5 to 25 parts by weight, of the references flame retardants for 100 parts by weight of the mixture of organic polyisocyanate and dispersion.

More detailed information concerning the above-referenced and other commonly used additives are contained in the literature, for instance the monograph by J. H. Saunders and K. C. Frisch *High Polymers*, Volume XIV, "Polyurethanes", Parts 1 and 2 (Interscience Publishers, 1962 and 1964).

In order to prepare urethane group containing foams, the organic polyisocyanates and dispersants, and/or mixtures of dispersions and additional polyester polyols, and/or polyether polyols are reacted in such quantities that the ratio of reactive hydrogen atoms to isocyanate groups is 1:0.8 to 2.5, preferably 1:0.8 to 1.2 and particularly approximately 1:1 and such that the amount of polyester (a) as the disperse phase in the foamable reaction mixture is from 0.5 to 30 percent by weight, preferably 1 to 26 percent by weight, relative to the overall weight of polyhydroxy compounds, (including the optionally used chain extenders or crosslinking agents.)

For the preparation of urethane group containing polyisocyanurate foams, quantity ratios of isocyanate groups of the polyisocyanates to reactive hydrogen atoms of the crystallized suspension of 2 to 60:1, preferably of 2 to 10:1, have proven to work well. The amount of polyester (a) as the disperse phase in a foamable reaction mixture in this case also is from 0.5 to 30 percent by weight, preferably 1 to 26 percent by weight, relative to the overall weight of polyhydroxyl compounds, (including the optionally used chain extenders or crosslinking agents).

The urethane and/or isocyanurate group containing foams are preferably prepared according to the one shot process. For this purpose the polyisocyanates are intensively mixed with the subject dispersion, catalysts, blowing agents and optionally used auxiliaries and additives in the referenced quantity ratios, at temperatures of 0° C. to 50° C., preferably 15° C. to 40° C., and the reaction mixture is then allowed to foam in open or closed molds.

The polyurethane foams produced in accordance with this invention have densities of 10 grams to 300 grams/liter, preferably 60 grams to 130 grams/liter, when allowed to foam freely. The urethane group containing polyisocyanurate foams have densities of 5 grams to 100 grams/liter, preferably 10 grams to 50 grams/liter.

The foams are used as insulating materials in refrigeration, for insulating pipes, and in the construction industry.

The Examples which follow will illustrate in specific detail how to practice the subject invention, but are not intended to limit its scope or application. The parts referred to in the Examples are by weight.

EXAMPLES

The polyesters (a) which were used as the disperse phase of the dispersions prepared in the Examples are listed in Table 1. They were prepared by familiar methods of melting condensation.

In Table 1 the following properties listed are measured as follows:

(a) The melting viscosities were measured by using an Epprecht Viscosimeter or a torque rheometer (Rheomat T 15 by Contraves AG in Zurich).
(b) The softening point was measured by using the melting point measuring device 510 (by the Buchi Company in Flawil, Switzerland).

The polyhydroxyl compounds (b) or their mixtures which were used as the continuous phase of the dispersions prepared in the Examples are listed in Table 2.

TABLE 1

| | Polyesters (a) Used as Disperse Phase | | | | | Comparison Substances | |
|---|---|---|---|---|---|---|---|
| Designation | A | B | C | D | E | Z | Y |
| Polyester Components | Isophthalic acid Neopentyl glycol Ethylene glycol | Isophthalic acid Neopentyl glycol Ethylene glycol | Isophthalic acid Neopentyl glycol Ethylene glycol | Isophthalic acid Neopentyl glycol Ethylene glycol | Terephthalic acid ortho-phthalic acid Ethylene glycol | Terephthalic acid 1,4-butanediol — | ortho-phthalic acid ethylene glycol — |
| In Mole Ratio | 1:1.35:0.05 | 1:1.3:0.05 | 1:1.6:0.05 | 1:1.7:0.05 | 1:1:3.2 | 1:1.4 | 1:1.7 |
| Acid No. [mg KOH] | 4.6 | 5.0 | 4.1 | 4.0 | 1.6 | — | 1.8 |
| Hydroxyl No. [mg KOH/g] | 135 | 120 | 211 | 242 | 246 | — | 270 |
| Softening Point [°C.] according to KSN (Kramer-Sarnow-Nagel) | 55.5 | 61 | <55 | <55 | pasty at 25° C. | 193 | pasty at 25° C. |
| Viscosity [mPas] | | | | | | | |
| at 150° C. | 420 | 640 | 80 | 75 | 30 | — | — |
| 125° C. | 2,140 | 2,800 | — | — | 90 | — | — |
| 105° C. | — | 22,430 | — | — | — | — | — |
| 95° C. | 31,780 | — | — | — | — | — | — |

TABLE 2

| | Polyhydroxyl Compounds (b) | | |
|---|---|---|---|
| No. | Designation | Viscosity, mPas at 25° C. | Hydroxyl No. [mg KOH/g] |
| I | Polyether polyol based on sucrose/propylene oxide | 5,000 | 400 |
| II | Polyether polyol based on glycerine/propylene oxide | 1,200 | 400 |
| III | Polyether polyol based on sorbite/propylene oxide | 3,500 | 255 |
| IV | Polyether polyol based on glycerine/propylene oxide (80%)/ethylene oxide (20%) | 1,300 | 26 |
| V | Polyester polyol based on adipic acid-diethylene glycol Acid No. 2.8 [mg KOH/g] | 50 (75° C.) | 348 |
| VI | Polyether polyol based on glycerine/propylene oxide (85%)/ethylene oxide (15%) | 800 | 35 |
| VII | Polyester polyol based on ortho-phthalic acid/ethylene glycol (Mole Ratio 1:2) Acid No. 1.2 [mg KOH/g] | 29,160 (23° C.) | 362 |
| VIII | Polyether polyol based on sorbitol/water/propylene oxide | 18,750 | 490 |
| IX | Polyether polyol based on ethylene diamine/propylene oxide | 4,100 | 450 |

In order to illustrate how the disperse phase polyesters were prepared, the specific details for preparing polyester E will be set forth. This polyester was produced by melting condensation from terephthalic acid, orthophthalic acid and ethylene glycol in a mole ratio of 1:1:3.2.

During the first reaction stage the dimethyl ester of terephthalic acid was transesterified with ethylene glycol in the presence of 0.05 percent by weight of titanium tetrabutylate. After adding orthophthalic acid anhydride, the condensation was continued to an acid number of 1.6.

The product had a melting viscosity at 150° C. of 30 mPas and of 90 mPas at 125° C. and was pasty and partially crystalline at room temperature.

A polyester prepared for comparison purposes (Comparison Y) was prepared from orthophthalic acid anhydride and ethylene glycol in a mole ratio of 1:1.7 by way of melting condensation. The resulting polyester had an acid number of 1.8, a hydroxy number of 270, and was a viscous liquid.

Examples 1-9 illustrate the preparation of several dispersions prepared in accordance with the subject invention.

EXAMPLE 1

A mixture of 300 parts of polyester A, 375 parts polyether polyol I, and 150 parts polyether polyol II was heated to 145° C. in a 2 liter, 4 neck flask, while being stirred in the presence of flowing nitrogen. The resultant clear liquid was then allowed to cool to 105° C. for a period of 80 minutes and 8.2 parts of a dispersion of 20 percent by weight of polyester A and 80 percent by weight of polyether polyol I was added at this temperature. After cooling and stirring the mixture for 30 minutes, the reaction mixture will reach a temperature of 93° C. to 94° C. which was maintained for 90 minutes, after which the mixture was cooled to 60° C. within a period of 2.5 hours.

After adding 375 part of polyether polyol III, the dispersion was allowed to cool to room temperature while being stirred for several hours (approximately 16 hours).

The storage stable dispersion had a viscosity of 7140 mPas at 23° C. and 60.2 percent by weight of the disperse phase had particle sides of 10.5 to 30.5 microns. The particle distribution was measured in water with a Ryco counter.

In order to determine the cloud point, approximately 30 grams of the dispersion were heated to 145° C. in a test glass until a clear solution forms and were subsequently cooled while being agitated with a thermometer. A pronounced clouding occurred at 80° C.

EXAMPLE 2

A mixture of 57.6 parts polyether polyol I and 28.8 parts polyester A was heated to 138° C. in a 100 liter mixing vessel equipped with an anchor agitator and jacket heating system in the presence of nitrogen. The clear solution was allowed to cool to 105° C. within 60 minutes. Then 0.8 parts of a dispersion of the same components (previously separately produced) were added as a crystallization accelerator and the mixture was allowed to cool to 93° C. to 97° C. within a period of 35 minutes.

In this temperature range a white dispersion forms after approximately 30 minutes. Following this point the mixture was allowed to cool to 72° C. for 60 minutes. Then 33.6 parts of polyester polyol V was added while the mixture was agitated and the mixture was allows to cool to 30° C. within 16 hours.

The resultant storage stable dispersion had a viscosity at 23° C. of 5600 mPas. Measurement of the particle size distribution in water with a Ryco counter showed that 59.7 percent by weight of the disperse phase had a particle size of 10.5 microns to 25.5 microns.

The cloud point, which was determined in accordance with Example 1, was 77° C.

EXAMPLE 3

A mixture of 240 parts polyester A, 280 parts polyester V, and 480 parts polyether polyol I was heated to 140° C. as set forth in Example 1. Following this the clear solution was allowed to cool to 105° C. in a period of 60 minutes, whereupon three parts of the previously produced dispersion of the above-reference components were added. The mixture was then again allowed to cool to 95° C. to 96° C. for 30 minutes, was stirred for 120 minutes at this temperature, and was finally cooled to 70° C. at a rate of approximately 10° C. per hour. The mixture was cooled to room temperature within approximately 16 hours.

The storage stable dispersion with good flowing properties had a viscosity at 23° C. of 6800 mPas. The microscopy of this dispersion under polarized light and on a scale of 100:1 showed crystallite with particle sizes of 25 microns to 30 microns.

EXAMPLE 4

A mixture of 240 parts polyether B, 280 parts polyester polyol V, and 480 parts polyether polyol I was made into a dispersion in accordance with the procedure put forth in Example 3.

The storage stable dispersion with good flowing properties had a viscosity of 6600 mPas at 23° C. A transmitted light microscopy of this dispersion on a scale of 100:1 showed crystallite with particle diameters of 35 to 45 microns.

The cloud point, which was determined in accordance with the procedure set forth in Example 1, was 96° C.

EXAMPLE 5

A mixture of 1000 parts polyester C and 3000 parts polyether polyol IV was heated to 122° C. in a 6 liter, 4 neck flask, while being stirred in the presence of flowing nitrogen. The clear solution was allowed to cool to 33° C. for 4 hours and 20 minutes. At this time 12 parts of a previously produced dispersion of the above-referenced mixture was added. The reaction mixture was agitated for 12 hours at 30° C. and was subsequently cooled to room temperature.

The resultant dispersion had a viscosity at 23° C. of 6230 mPas and did not show any sedimentation after storage.

EXAMPLE 6

A mixture of 750 parts polyester D and 2250 parts polyether polyol VI was heated to 126° C. while being agitated in the presence of flowing nitrogen. The resultant clear solution was then cooled to 33° C. for 3 hours and 20 minutes. At this temperature 9 parts of a previously produced dispersion of the same raw materials was added. The mixture was agitated at 30° C. to 34° C. for 6 hours and was then cooled to 23° C. within a period of 8 hours.

The storable dispersion had a viscosity of 4000 mPas at 23° C.

For the determination of the coring temperature, 25 grams of polyester D and 75 grams of polyether polyol VI were heated to 140° C. in a test glass and were subsequently cooled while being agitated with a thermometer. A marked clouding was observed at 30° C.

When polyester D was crystallized in ethanol, the crystallizate showed a softening point of 100.5° C. according to KSN.

EXAMPLE 7

A mixture of 17.7 parts polyether polyol I, 28.4 parts polyether polyol II, and 13.1 parts polyether polyol VIII was heated to 119° C. in a 100 liter agitator vessel equipped with an anchor agitator and a jacket heating system in the presence of nitrogen. Upon reaching 119°

C., 25 parts of polyester A were added to the mixture while being agitated and the mixture was then heated to 148° C.

The clear solution was cooled to 102° C. within 50 minutes; 0.8 parts of a previously produced dispersion of the above-referenced materials was added; the mixture was allowed to cool to 90° C. within 30 minutes, and was then agitated in a temperature range of 88° C. to 92° C. for a period of 2.5 hours. Following this the mixture was allowed to cool to 68° C.; 15.8 parts of polyether polyol IX were added; and the mixture was cooled to 59° C. Following this process, the mixture was allowed to cool to room temperature within a period of approximately 18 hours.

The resultant dispersion showed fine particles, had good flowing properties, and had a viscosity of 25,440 mPas at 23° C.

EXAMPLE 8

A mixture of 90 parts by weight polyester polyol I and 10 parts by weight polyester E was heated to 125° C. in a 4 neck flask while being stirred in the presence of nitrogen. A clear solution was obtained. At 120° C. and while the mixture was being agitated at 500 rpm, 5.1 parts of a dispersion produced in accordance with Example 1 were added to the solution. Finally, the mixture was allowed to cool to 90° C. while being agitated at 250 rpm for 20 minutes. During another period of time of 1.5 hours the mixture was allowed to cool to 72° C. and then to room temperature within a period of 16 hours.

The resultant storage stable dispersion has a viscosity of 12,700 mPas at 23° C.

EXAMPLE 9

A mixture of 70 parts by weight polyester polyol V and 0 parts by weight polyester E was heated to 125° C. in accordance with Example 8. Then 5.1 parts by weight of a dispersion produced in accordance with Example 1 was added to the clear solution at 120° C. while the mixture was being stirred at 550 rpm. Following this the agitator speed was reduced to 250 rpm and the mixture was allowed to cool to 35° C. within 5 hours and to room temperature within 16 hours. The storage stable dispersion had a viscosity of 2770 mPas at 23° C.

COMPARISON EXAMPLE A

In a 2 liter, 4 neck flask, 906 parts of polyether polyol I were heated to 177° C. In the presence of flowing nitrogen, 160 parts of a 180° C. hot melt of polyester A were added to the polyether polyol while the mixture was stirred. The resultant clear solution was allowed to cool to initially 126° C. in 20 minutes, and subsequently to 53° C. within 3.5 hours. At this temperature, coarse, solid particles were formed which precipitate along the glass wall and on the agitator. A processible dispersion was not obtained.

COMPARISON EXAMPLE B

A mixture of 480 parts polyether polyol I, 280 parts polyester polyol V, and 240 parts polyester Z were heated to 210° C. in accordance with the procedure set forth in Example 1. Upon cooling of the resultant clear solution a clouding was incurred at 184° C. which increased with decreasing temperature of the mixture. After approximately 2 hours a white dispersion was obtained at 140° C. which formed a stiff crystal slurry after having been cooled to 65° C. for 3 hours. The slurry precipitated on the glass walls. The crystal slurry was totally rigid at room temperature and no longer flowed.

COMPARISON EXAMPLE C

A mixture of 120 parts of polyester A and 1080 parts of polyether polyol VI were heated to 184° C. in accordance with the procedure set forth in Example 1 with a pronounced clouding remaining in the solution. If the mixture is allowed to cool to 62° C. within 4.5 hours the polyester agglomerated and precipitated on the agitator.

In order to examine the miscibility 25 grams of polyester A and 75 grams of polyether VI were heated to 160° C. in a test glass while being stirred with a thermometer. Upon reaching this temperature a clear solution had not yet been achieved.

COMPARISON EXAMPLE D

A clear solution was produced from 70 parts by weight of polyether polyol VI and 30 parts by weight of polyester Y by stirring and heating to 80° C. Upon cooling to room temperature no crystals had formed in the mixture.

Examples 10–14 illustrate the preparation of several polyurethane and polyisocyanurate compositions.

EXAMPLE 10

A rigid polyurethane foam was prepared as follows: Component A (consisting of 100 parts by weight of a dispersion produced according to Example 1, 1 part by weight of a foam stabilizer based on silicone (DC 190), 1.6 parts by weight of a catalyst mixture consisting of 80 percent by weight of triethylamine and 20 percent by weight of endomethylenepiperazine, and 14.8 parts by weight of trichlorofluoromethane) and Component B (consisting of 83.23 parts by weight of a mixture of diphenyl methane diisocyanates and polyphenyl-polymethylene polyisocyanates having an NCO content of 31 percent by weight) were mixed intensively at room temperature for 20 seconds. The foamable mixture was introduced into an open mold and was allowed to foam.

The resultant polyurethane foam was determined to have the following mechanical properties:

| | |
|---|---|
| Cream time | 53 seconds |
| Gel Time | 151 seconds |
| Rise Time | 246 seconds |
| Density | 60.4 kg/cubic meter |
| Vending Strength according to DIN 53 423 parallel to the foaming direction | 0.86 N/mm$^2$ |
| Perpendicular to the foaming direction | 0.66 N/mm$^2$ |
| Compression strength according to DIN 53 421 parallel to the foaming direction | 0.4 N/mm$^2$ |
| Perpendicular to the foaming direction | 0.29 N/mm$^2$ |

EXAMPLE 11

A rigid polyisocyanurate foam was prepared as follows:

Component A (consisting of 100 parts by weight of a dispersion produced in accordance with Example 2, 0.67 parts by weight of a foam stabilizer based on silicone (DC 193), 17.65 parts by weight of trichloroethylphosphate, 0.067 parts by weight of triethylamine, 2.0 parts by weight of a 35 percent of weight solution of potassium formate in ethylene glycol, and 39.3 parts by weight of trichlorofluoromethane) and Component B (consisting of 165.2 parts by weight of a mixture of diphenylmethane diisocyanates and polyphenyl-polymethylene polyisocyanates (crude MDI) with an NCO content of 31 percent by weight) were mixed intensively at room temperature for 30 seconds. The foamable mixture was introduced into an open mold and was allowed to foam.

The following mechanical properties of the resultant foam were measured:

| | |
|---|---|
| Cream time | 62 seconds |
| Gel time | 130 seconds |
| Rise time | 200 seconds |
| Density | 33.9 kg/cu. meter |
| Burn Test according to DIN 4102:B | |
| Bending strength according to DIN 53 423 parallel to to the foaming direction | 0.23 N/mm$^2$ |
| Compression strength according to DIN 53 421 parallel to the foaming direction | 0.27 N/mm$^2$ |
| perpendicular to the direction of foaming | 0.13 N/mm$^2$ |

EXAMPLE 12

A rigid polyurethane foam was prepared as follows: Component A (consisting of 100 grams of a dispersion produced according to Example 1, 15 grams of a brominated and chlorinated polyether polyol) (Ixol® B 251 by the Solvay Co. in Paris, France), 1.0 grams of a foam stabilizer based on silicones (DC 190), 0.1 grams triethylamine, and 5.5 grams trichlorofluoromethane and Component B (consisting of 103.6 grams crude MDI with an NCO content of 31 percent by weight) were mixed intensively at room temperature for 30 seconds. The foamable mixture was poured into a carton (21.5×21.5 cm) and was allowed to foam.

The resultant polyurethane foam had the following properties:

| | |
|---|---|
| Cream time | 10 minutes |
| Density | 316 kg/cubic meter |
| Maximum reaction temperature in the foam core | 126° C. |

EXAMPLE 13a–c

Several semi-rigid polyurethane foams were prepared using the following ingredients:

| Example 13 | a Parts | b Parts | c Parts |
|---|---|---|---|
| Component A | | | |
| Polyether polyol of trimethylol propane/propylene oxide/ethylene oxide (80:20% by wt.) OH No.: 26.5 | 68.05 | 62.85 | 58.05 |
| Polyether polyol from sucrose/propylene oxide OH No.: 400 | 22.52 | 22.52 | 22.52 |
| Dispersion produced in accordance with Example 6 | 5.0 | 10.0 | 15.0 |

| Example 13 | a Parts | b Parts | c Parts |
|---|---|---|---|
| 33% solution of endomethylene piperazine and dipropylene glycol | 1.3 | 1.5 | 1.3 |
| Dimethylethylamine | 0.18 | 0.18 | 0.18 |
| Water | 2.95 | 2.95 | 2.95 |
| Component B | | | |
| Crude MDI | | | |
| Mixing Ratio A:B = 100: | 76 | 76 | 75 |

In order to prepare the foams, 477 parts of Component A and 363 parts of Component B were mixed intensively in a 2.5 liter glass beaker having a diameter of 15 centimeters with a lab agitator (diameter of the agitator disk 60 millimeters, agitator speed 1,350 rpm) for 10 minutes. The foamable mixture was introduced into a steel mold having dimensions of 700×100×100 mm which had been heated to 47.5° C.±2.5° C. and the mold was closed. After 6.5 minutes the cover was unlocked. The demold time of the parts was 7 to 7.5 minutes.

The following characteristic properties were measured on the resultant molded parts:

| Example 13 | a | b | c |
|---|---|---|---|
| Cream Time [seconds] | 12 | 12 | 15 |
| Rise Time [seconds] | 120 | 95 | 130 |
| Density (free foamed) [kg/cubic meter] | 48.5 | 47 | 50 |
| Closed Cells (%) | 38 | 48 | 58 |
| Demold Time [minutes] | 7 | 7.3 | 7.5 |

COMPARISON EXAMPLE E

If one proceeds according to the procedure put forth in Example 13a but eliminates the use of the dispersion according to Example 6, a molded part is obtained which contains 55 percent closed cells. The demold time is 12 minutes.

EXAMPLE 14

A noncellular polyurethane elastomer was prepared as follows:

Component A [consisting of 98 parts by weight of a dispersion according to Example 7, 0.7 part by weight of a foam stabilizer based on silicone (OS 710 by Bayer AG), 0.35 part by weight of a foam stabilizer based on silicone (DC 190), 0.62 part by weight of a 33% solution of endomethylene piperazine and dipropylene glycol, and 0.75 part by weight of an ester of fatty acid (Additive SM by Bayer AG),] and Component B [consisting of 110 parts by weight of a mixture of 80 percent by weight crude MDI (NCO content 31 percent by weight) and 20 percent by weight of a prepolymeric isocyanate consisting of 49 percent by weight of toluene diisocyanate (TDI 80, NCO content 48 percent by weight, 80 percent 2,4-isomers), 41.2 percent by weight of polyether polyol based on trimethylolpropane/propylene oxide (OH No. 42), and 9.8 percent by weight of polyether based on diethylene triamine/glycerine/propylene oxide (OH No. 550)] were mixed intensively and were poured into a metallic mold, and were allowed to cure at 25° C. for 12 hours.

The following properties were measured on the resultant molded part:

| | |
|---|---|
| Cream Time [seconds] | 50 to 60 |
| Rise Time [seconds] | 200 |
| Density [kg/cubic meter] | 230 |
| Reaction Temperature [°C.] | 142 |
| After 10 minutes, Core Cracks | none |

COMPARISON EXAMPLE F

A noncellular polyurethane elastomer was prepared as follows:

Component A (consisting of 22.66 parts by weight of a polyether polyol of sorbitol/propylene oxide, OH No. 490, 20.65 parts by weight of a polyether polyol of ethylene diamiine/propylene oxide, OH No. 450, 33.65 parts by weight of a polyether polyol of glycerine/propylene oxide, OH No. 400, 23.20 parts by weight of a polyether polyol of sucrose/propylene oxide, OH No. 400, 0.17 part by weight of 0.35 part by weight of a foam stabilizer based on silicone (DC 190), and 0.62 part by weight of a 33 percent solution of endomethylenepiperazine and dipropylene glycol) and Component B (consisting of 110 parts by weight of an isocyanate component such as that described in Example 14) were mixed intensively and are poured into a metal mold, and are allowed to cure at 25° C. in 12 hours.

The molded part had the following properties:

| | |
|---|---|
| Cream Time [seconds] | 60 |
| Rise Time [seconds] | 200 |
| Density [kg/cubic meter] | 220 |
| Reaction Temperature after 10: minutes [°C.] | 169 |
| Core Cracks | yes |

The embodiments of the invention in which an exclusive privilege or property is claimed are defined as follows:

1. A storage stable dispersion comprising
   (a) a disperse phase comprising from 5 to 35 percent by weight relative to the overall dispersion of a crystallizable polyester of (i) an acid selected from the group consisting of isophthalic acid, terephthalic acid, a mixture of terephthalic acid and an aliphatic dicarboxylic acid, a mixture of terephthalic acid and an aromatic dicarboxylic acids, and a mixture of terephthalic acid, an aliphatic dicarboxylic acid, and an aromatic dicarboxylic acid, and (ii) an alcohol having 1 to 6 carbon atoms wherein said polyester has a melting viscosity at 150° C. of 15 mPas to 3000 mPas; and
   (b) a continuous phase consisting of from 65 to 95 percent by weight relative to the overall dispersion of a polyhydroxyl compound having a melting point below 30° C. such that the disperse phase is soluble at temperatures above 35° C. and such that more than 50 percent of the dispersed phase has particle sizes of 10.5 to 100 microns.

2. The storage-stable dispersions of claim 1 wherein the polyester (a) contains at least one radical with a Zerewitinoff active hydrogen atom in bonded form.

3. The storage-stable dispersions of claim 1 wherein isophthalic acid is used to prepare the polyester (a).

4. The storage-stable dispersions of claim 1 wherein mixtures of terephthalic acid and aromatic and/or aliphatic dicarboxylic acids with a terephthalic acid content of 20 to 95 mole percent relative to the dicarboxylic acid mixture are used to prepare the polyester (a).

5. The storage-stable dispersions of claim 1 wherein diols with 2 to 6 carbon atoms and primary hydroxyl groups are used as alcohols to prepare the polyester (a).

6. The storage-stable dispersions of claim 1 wherein isophthalic acid and neopentyl glycol or mixtures of neopentyl glycol and ethylene glycol, 1,4-butanediol or 1,6-hexanediol are used to prepare the polyester (a).

7. The storage-stable dispersions of claim 1 wherein isophthalic acid, neopentyl glycol and ethylene glycol in a mole ratio of isophthalic acid to the total of the diols of 1:1.25 to 1:2 are used to prepare the polyester (a).

8. The storage-stable dispersions of claim 1 wherein the polyesters (a) have a melting viscosity at 150° C. of 30 mPas to 700 mPas and the polyhydroxyl compounds (b) have a functionality of 2 to 8 and a hydroxyl number of 20 to 800 with more than 50 percent by weight of a dispersed phase being present with a particle size of 12 to 100 microns.

9. A process for preparing the storage-stable dispersion of claim 1 comprising
   (a) heating compounds (a) and (b) as defined in claim 1 to from 35° C. to 160° C.;
   (b) cooling;
   (c) adding from 0.01 to 3.0 parts by weight per 100 parts of components (a) and (b) of a crystallization accelerator at a temperature above the cloud point of components (a) and (b) but below the melting temperature of the crystallization accelerator; and
   (d) cooling.

10. The process of claim 9 wherein the crystallization accelerator is the same as components (a) and (b).

11. In a process for the preparation of a polymer containing urethane and/or isocyanurate groups comprising reacting an organic polyisocyanate with a compound containing at least two active hydrogen atoms, the improvement comprises using the dispersion of claim 1 as the active hydrogen-containing compound.

* * * * *